United States Patent [19]

Gardner et al.

[11] 3,903,057

[45] Sept. 2, 1975

[54] PROCESS FOR PREPARING OF CREEP RESISTANT PRESSURE-SENSITIVE RESINS

[75] Inventors: Donald M. Gardner, Springfield; Lawrence W. McKenna, Wilbraham, both of Mass.

[73] Assignee: Monsanto Company, St. Louis, Mo.

[22] Filed: Feb. 20, 1973

[21] Appl. No.: 333,915

[52] U.S. Cl. ........ 260/78.5 T; 117/76 A; 117/76 P; 117/122 P; 117/123 D; 260/78.5 R; 260/80.72; 260/80.8; 260/80.81
[51] Int. Cl.² .... C08F 8/30; C08F 20/06; C09J 7/04
[58] Field of Search............ 260/80.72, 80.8, 80.81, 260/78.5 R, 78.5 T; 117/122 P, 76 A, 76 P

[56] References Cited
UNITED STATES PATENTS

| | | | |
|---|---|---|---|
| 2,723,195 | 11/1955 | Blake | 92/3 |
| 3,563,953 | 2/1971 | Lehmann et al. | 260/63 |
| 3,694,418 | 9/1972 | Fock et al. | 260/78.5 R |
| 3,697,618 | 10/1972 | Grunewalder et al. | 260/78.5 R |

*Primary Examiner*—Joseph L. Schofer
*Assistant Examiner*—John Kight
*Attorney, Agent, or Firm*—R. B. Blance; E. P. Grattan; J. C. Logomasini

[57] ABSTRACT

A process comprising solution interpolymerizing a pressure-sensitive resin containing an acid-epoxy monomer system, formulating the interpolymer solution with the 1,3-bis(dimethylamino)-2-hydroxypropane and coating the solution on a substrate to obtain a film of pressure-sensitive resin thereon. The pressure-sensitive film possesses cohesive strength and exhibits low release values from silicone coated release paper.

5 Claims, No Drawings

PROCESS FOR PREPARING OF CREEP RESISTANT PRESSURE-SENSITIVE RESINS

BACKGROUND OF THE INVENTION

1. Field of the Invention

The present invention relates to organic solvent solutions containing acid-epoxy pressure-sensitive adhesive resins capable of self-cure for increased cohesive strength, the self-curing reaction being catalyzed by a tertiary amine. In another aspect, the invention relates to a process of manufacture of articles containing films of pressure-sensitive resin.

2. Description of the Prior Art

Pressure-sensitive resins are used conventionally in the form of films to provide adhesive bonds between normally non-adhering superstrates and substrates. The films may be prepared by casting from organic solvent solutions and evaporating the solvent.

Constraints are placed on the molecular weight of the pressure-sensitive resin by the viscosity of the solution necessary for ease of coating on commercial coating machines and by the solution concentration required for economical operation. In general, low solution viscosity and high solution concentration are desired in the pressure-sensitive resin solution, and, hence, a resin of relatively low molecular weight is preferred for film casting.

Once a bond has been made by a pressure-sensitive film placed between a substrate and a superstrate, the pressure-sensitive film may be subjected to stress generated by the weight of the superstrate or by dimensional change in the substrate or superstrate caused by thermal expansion, stress relaxation, plasticizer migration or the like. In general, a high molecular weight and a high cohesive strength is desired in the pressure-sensitive resin so that it may resist the stresses induced in the adhesive film. The opposing requirements of low molecular weight resin for ease of coating and high molecular weight resin for load holding ability are conventionally reconciled by the use of crosslinkable resin systems which can be applied at low molecular weight and cured to a high molecular weight.

Pressure-sensitive adhesive resins containing epoxy and acid groups are widely used because of their ability to self-crosslink on drying and heating to produce pressure-sensitive adhesive films with high cohesive strength. However, the rate of curing of these systems is often too slow for drying and curing conditions used in practice and a catalyst for the acid-epoxy reaction must then be added to the solution before coating.

Tertiary amines are widely accepted as catalysts for the acid-epoxy reaction. Generally, however, the curing rate with the majority of tertiary amines is still insufficient for the drying and curing conditions used in practice. One tertiary amine which has proved to be exceptionally effective for the crosslinking reaction is triethylenediamine. Triethylenediamine has the disadvantage, however, of conferring very short pot life to the pressure-sensitive resin solution. In commercial use, pot life determines the useful coating life time of catalyzed batches of pressure-sensitive adhesive solutions. Catalyzed solutions with short pot lives place severe limitations on the usefulness of the material, regardless of the properties of the adhesive. Furthermore, triethylenediamine causes an interaction between the pressure-sensitive adhesive and silicone release substrates, particularly if the release substrates are not substantially completely cured. This leads to undesirably high adhesion between the adhesive and release surface with the result that the release paper is difficult to remove and the adhesive properties of the pressure-sensitive adhesive film are impaired. There is, therefore, a need in the art for acid-epoxy pressure-sensitive resin solutions containing a tertiary amine which possess adequate pot life which yield adequate rates of cure and which yield cured pressure-sensitive resins with satisfactory release properties from release substrates.

SUMMARY OF THE INVENTION

The above-mentioned need in the art is fulfilled by the present invention of acid-epoxy pressure-sensitive resin solutions containing a tertiary amine catalyst which have adequate pot life. The pressure-sensitive solutions contain:

A. an organic solvent solution of an interpolymer comprising:
  1. between 0.1 and 15 weight per cent of an $\alpha,\beta$-ethylenically unsaturated aliphatic carboxylic acid,
  2. between 0.1 and 2 weight per cent of a glycidyl monomer selected from the group consisting of glycidyl acrylate, glycidyl methacrylate and allyl glycidyl ether,
  3. between 35 to 84.9 weight per cent of a monomer selected from the group consisting of esters of acrylic acid and methacrylic acid containing from 6 to 20 carbon atoms, and
  4. optionally a monomer selected from the group consisting of $\alpha$-olefins containing 2 to 10 carbon atoms, vinyl esters of alkanoic acids containing from 3 to 10 carbon atoms, ethyl and methyl esters of acrylic and methacrylic acids, acrylonitrile, methacrylonitrile, styrene, and vinyl chloride, wherein the interpolymer has a weight average molecular weight in the range of 10,000 to 500,000 and a glass transition temperature in the range of $-15°$ to $-75°C$.; and B. 1,3-bis(dimethylamino)-2-hydroxypropane; wherein there are between 0.01 and 1.0 parts by weight of the 1,3-bis(dimethylamino)-2-hydroxypropane per 100 parts by weight of interpolymer.

The invention further provides articles of manufacture comprising films of pressure-sensitive resin containing the abovedescribed interpolymer and 1,3-bis(dimethylamino)-2-hydroxypropane and provides a process for the manufacture of such articles.

DESCRIPTION OF THE INVENTION

The practice of the present invention involves the preparation of the interpolymer which is then formulated with the 1,3-bis(dimethylamino)-2-hydroxypropane. The solution is cast on a substrate and the resulting film is dried and cured to a permanently tacky composition with improved cohesive strength.

The interpolymer comprises monomers selected from the groups (1), (2), (3) and (4) (described above). Group (1) monomers are exemplified by acrylic acid, methacrylic acid, crotonic acid, isocrotonic acid and the like, maleic acid, fumaric acid, citraconic acid, itaconic acid, and the like, and the alkyl monoesters of maleic acid, fumaric acid, citraconic acid and itaconic acid in which the alkyl group contains from 1 to 4 carbon atoms such as methyl, ethyl, propyl and butyl maleates and the like. Preferred acid monomers include acrylic acid and methacrylic acid.

Group (2) monomers are selected from the group consisting of glycidyl acrylate, glycidyl methacrylate and allyl glycidyl ether.

Group (3) monomers include the esters of acrylic and methacrylic acid containing from 6 to 20 carbon atoms. Preferred esters contain branched chain alkyl groups such as isobutyl acrylate, 2-ethylhexyl acrylate and 2-ethylhexyl methacrylate. The pressure-sensitive resin need only contain monomers from Groups (1), (2), and (3). However, optionally monomers from Group (4) may also be present. Group (4) includes α-olefins containing from 2 to 10 carbon atoms, vinyl esters of alkanoic acids containing 3 to 10 carbon atoms, such as vinyl acetate and vinyl octoate, ethyl and methyl esters of acrylic acid and methacrylic acids, acrylonitrile, methacrylonitrile, styrene and vinyl chloride.

The ratio of monomers in the interpolymer is selected so that the glass transition temperature is in the range of −15 to −75°C. A suitable ratio is conventionally calculated from the equation:

$$\frac{1}{T_g} = \frac{W_1}{T_{g_1}} + \frac{W_2}{T_{g_2}} + \ldots \frac{W_n}{T_{g_n}}$$

where $T_g$ is the glass transition temperature of the interpolymer expressed as degrees Kelvin, $T_{g_1}$, $T_{g_2}$, etc. are the glass transition temperatures of the homopolymers of the respective comonomers and $W_1$, $W_2$, etc. are the weight fractions of comonomers required for a specific glass transition temperature of the interpolymer. Glass transition temperatures may be determined experimentally by conventional methods such as by means of the duPont Differential Thermal Analyzer.

The weight average molecular weight of the interpolymer is in the range of 10,000 to 500,000, corresponding to a relative viscosity in the range of 1.1 to 7.0 measured on a 2 weight per cent solution of interpolymer in benzene. The preferred molecular weight range is from 20,000 to 300,000, providing adequate cohesive strength to the interpolymer without excessive solution viscosity.

The interpolymers are conveniently prepared by the process set forth in U.S. Pat. No. 3,284,423 to Edmund C. Knapp.

The solids contents of the resin solutions of this invention should generally not exceed 50 percent by weight if the solution is to have appropriate viscosity and pot life. In these respects, the preferred solutions contain ethyl acetate-hexane in the ratio of between 5:1 and 3:2 and have a total solids content of about 30 to 45 per cent by weight and a viscosity within the range of about 100 to about 30,000 centipoises at 25°C. Furthermore, these resin solutions are compatible with many common organic solvents. For example, they may be diluted with equal volumes of the following solvents to give clear, useful solutions: acetone, isopropanol, butyl alcohol, 2-ethoxyethyl alcohol, 2-butoxyethyl alcohol, carbon tetrachloride, ethyl acetate, hexane, methyl alcohol, methyl isobutyl ketone, toluene, 1,1,1-trichloroethane, and so on.

The method of polymerization is not critical in that the process can be carried out in solution or in emulsion. Care should be taken, however, to keep the reaction temperature below the level at which the acid compound and the epoxide interact and cause gelation.

The polymerization is preferably carried out by heating the monomers at 65° to 80°C. in the presence 0.1 to 0.5 percent of free radical initiator, based on the weight of the monomer charge.

The following resins were made by the process described in U.S. Pat. No. 3,284,423. All parts and percentages are by weight unless otherwise specified. The terms interpolymer and resin are used interchangeably.

EXAMPLES 1–4

| Resin Solution Compositions, Parts by Weight | Ex. 1 | Ex. 2 | Ex. 3 | Ex. 4 |
|---|---|---|---|---|
| Acrylic Acid | 6.6 | 6.9 | 7.4 | 5.0 |
| Glycidyl Methacrylate | 0.07 | 0.2 | 0.35 | — |
| Allyl Glycidyl Ether | — | — | — | 1.0 |
| 2-Ethylhexyl Acrylate | 60.0 | 60.0 | 60.0 | 74.0 |
| Methyl Acrylate | 33.0 | 32.5 | 32.0 | — |
| Vinyl Acetate | — | — | — | 20 |
| Ethyl Acetate | 95.0 | 95.0 | 95.0 | 80.0 |
| Hexane | 19.0 | 19.0 | 19.0 | — |
| Toluene | — | — | — | 24.0 |

Formulation of the acid-epoxy pressure-sensitive resin solutions with the amine catalyst is conveniently carried out by preparing a solution of the amine in an organic solvent at a concentration between 5 and 50 percent and adding the solution to the pressure-sensitive resin solution slowly with stirring to disperse the amine uniformly throughout. The amount of 1,3-bis(dimethylamino)-2-hydroxypropane added to the resin solution is between 0.01 and 1.0 parts by weight per 100 parts by weight of resin and is preferably between 0.05 and 0.4 parts by weight for adequate viscosity stability and curing rate.

The formulated solutions are subjected to determination of viscosity over a period of at least 24 hours at 25°C. to determine the pot life. The viscosity is determined at 25°C. by the conventional method using a Brookfield Model LVF Viscometer and the appropriate spindle and speed.

Data for Resin Examples 1 and 2 diluted to 30 per cent solids are presented in Table 1. In the Tables which follow, triethylenediamine is designated as TDA and 1,3-bis(dimethylamino)-2-hydroxypropane is designated as BDMAHP.

TABLE I

| Resin Ex. 1 | Parts Catalyst per 100 Parts Resin | Brookfield Viscosity (centipoises) | |
|---|---|---|---|
| | | Initial | 315 Hrs. |
| Uncatalyzed | — | 3,150 | 3,350 |
| TDA | 0.2 | 3,550 | >50,000 |
| BDMAHP | 0.15 | 3,750 | 3,800 |
| BDMAHP | 0.30 | 4,740 | 5,000 |
| Resin Ex. 2 | | | |
| Uncatalyzed | — | 2,300 | 2,400 |
| TDA | 0.2 | 2,300 | Gel |
| BDMAHP | 0.2 | 2,00 | 2,600 |

The data show that resin solutions containing 1,3-bis(dimethylamino)-2-hydroxypropane are vastly superior to resin solutions containing triethylenediamine in viscosity stability and pot life.

The effect of catalyst on the curing rate is determined by comparing the creep resistance of the catalyzed and uncatalyzed pressure-sensitive resins and by comparing the degree of cure of the catalyzed and uncatalyzed resins.

CREEP RESISTANCE

The pressure-sensitive resin solutions are cast on silicone release paper and the cast films are dried for 15 minutes at room temperature and 2 minutes at 90°F. The films (0.8 mil thickness) are cooled to room temperature and transferred to a film of polyester sold under the trademark MYLAR. The MYLAR film is cut into one-half inch strips which are applied to polished stainless steel to form 0.25 square inch bonds. The bonds are held in a vertical plane at 70°F. and 50 percent relative humidity and are loaded with one-pound weights. The time in hours for failure of the bond after application of the load is determined. Data for the resin of Example 1 cured for 2 minutes and for 60 minutes at 100°C. are presented in Table 2.

TABLE 2

| Resin Ex. 1 | Parts Catalyst per 100 Parts Resin | Creep Time to Failure, Hrs. | |
|---|---|---|---|
| | | 2 min. | 60 min. |
| Uncatalyzed | — | 1.0 | 13 |
| TDA | 0.2 | 1.5 | 22 |
| BDMAHP | 0.15 | 1.3 | 29 |
| | 0.30 | 1.6 | 41 |

The data show that cured films containing 1,3-bis(dimethylamino)-2-hydroxypropane as the cure catalyst are superior in cohesive strength to films of the same polymer without catalyst or with triethylenediamine catalyst.

DEGREE OF CURE

The degree of cure of the pressure-sensitive resin is determined by heating a dry film of the resin for 5 minutes at 110°C. A 1 gram sample of the resin is stirred in a 100 ml. graduated glass cylinder with 99 ml. toluene. The resin swells and dissolves at least partially. After 24 hours of stirring, the swollen resin is allowed to settle in the graduate for 24 hours. The volume of swollen resin is noted and the swelling index is calculated as the ratio of the volume of swollen resin to the volume of the unswollen resin. A 20 ml. sample of the supernatant solvent is taken out through a plug of cotton into a pipette. The resin content of the sample is determined, and, hence, the fractions of soluble resin and insoluble resin in the cured film are determined. In Table 3, data for resin Example 3 catalyzed with triethylamine, triethylenediamine and 1,3-bis(dimethylamino)-2-hydroxypropane are compared with an uncatalyzed sample of resin. The tertiary amine catalyst is present in a concentration of 1.78m.moles per 100 grams resin.

TABLE 3

| Resin Example 3 | Insoluble Fraction | Swelling Index |
|---|---|---|
| Uncatalyzed | 0 | — |
| Triethylamine | 0 | — |
| TDA | 0.36 | 50 |
| BDMAHP | 0.10 | 80 |

The data show that triethylenediamine and 1,3-bis(dimethylamino)-2-hydroxypropane are very effective cure catalysts in comparison with triethylamine. In general, an insoluble fraction of 0.02 or greater is associated with appreciable cohesive strength in the pressure-sensitive resin.

KEIL RELEASE VALUES

Keil release values for the pressure-sensitive resins are determined by coating a silicone release paper with pressure-sensitive resin solution and allowing the solution to dry for 15 minutes. at 70°F. and for 2 minutes at 90°C. The dry film thickness is 2 mil. MYLAR polyester film of 1 mil thickness is applied with the standard 4-pound roller specified by the Pressure Sensitive Tape Council to the pressure-sensitive film. Strips of the MYLAR release paper laminate 1 inch in width are cut. The strips are subjected to a T-peel test on an Instron Tensile Tester Machine, with a crosshead speed of 12 inches per minute. The peel value of Keil release value expressed as grams per inch width is obtained. The release values, initial, after 24 hours at 70°C. and after 88 hours at 70°C. are determined. The data for resin Example 2 are presented in Table 4. The catalyst is present in a concentration of 1.78m.moles per 100 grams resin.

TABLE 4

| | Keil Release Value, grams per inch width | | |
|---|---|---|---|
| Catalyst | Initial | 24 Hrs. 70°C. | 88 Hrs. 70°C. |
| TDA | 22 | 38 | 77 |
| BDMAHP | 19 | 25 | 29 |

Keil release values less than 30 grams per inch width are generally acceptable. The data show the rapid increase in Keil release value of the resin containing triethylenediamine to an unacceptable value upon accelerated aging at 70°.

The compositions of the present invention may be used as the adhesive component in pressure sensitive tapes, films and foams. They adhere well to resin surfaces such as plasticized poly(vinyl chloride) MYLAR, cellulose acetate, nylon, polyethylene and polypropylene, as well as to paper, metal and painted surfaces. They are especially useful as the adhesive component of decorative vinyl sheets and decals, conferring excellent shrink resistance to vinyl film. Their outstanding tack, wetting and holding power may be used to advantage in transfer adhesive applications.

Articles of manufacture such as tapes, decals, decorative vinyl sheets and transfer films containing the pressure-sensitive resin composition of the present invention are prepared by coating the resin on the appropriate substrate by conventional coating methods. Such articles conventionally include a release paper for temporary protection of the adhesive film until the adhesive bond is made. The thickness of the adhesive film is generally in the range of 0.2 to 5 mil.

Application of the film to the substrate is conventionally carried out on roll coaters such as reverse roll and gravure roll coaters. The resin solution viscosity is adjusted to between 25 and 5,000 centipoises with higher viscosities within the range preferred for reverse roll coating and lower viscosities within the range preferred for gravure coating. The coatings are applied at a rate of between 10 feet per minute and 1,000 feet per minute.

While the present invention has been described with particular reference to certain specific embodiments thereof, it will be understood that certain changes, substitutions and modifications may be made therein without departing from the scope thereof. This invention also contemplates the use of fillers, extenders, stabilizers, antioxidants, plasticizers, tackifiers, flow control agents, adhesion promoters, dyes, etc. in the pressure-sensitive resin solutions and the pressure-sensitive resins of this invention.

What is claimed is:

1. A process of manufacture of a pressure-sensitive adhesive coated article which is readily released from silicone release surfaces and which provides bonds of high cohesive strength, comprising:
  A. polymerizing in an organic solvent medium an interpolymer containing:
   1. between 0.1 and 15 weight per cent of an $\alpha,\beta$-ethylenically unsaturated aliphatic carboxylic acid,
   2. between 0.1 and 2 weight per cent of a glycidyl monomer selected from the group consisting of glycidyl acrylate, glycidyl methacrylate and allyl glycidyl ether,
   3. between 35 to 84.9 weight per cent of a monomer selected from the group consisting of esters of acrylic acid and methacrylic acid containing from 6 to 20 carbon atoms, and
   4. optionally, a monomer selected from the group consisting of $\alpha$-olefins containing from 2 to 10 carbon atoms, vinyl esters of alkanoic acids containing from 3 to 10 carbon atoms, ethyl and methyl esters of acrylic and methacrylic acids, acrylonitrile, methacrylonitrile, styrene and vinyl chloride, wherein the interpolymer has a weight average molecular weight in the range of 10,000 to 500,000 and a glass transition temperature in the range of $-15°$ to $-75°C$.; and
  B. adding between 0.01 and 1.0 parts of the 1,3-bis(dimethylamino)-2-hydroxypropane per 100 parts of interpolymer; and
  C. coating the interpolymer solution on the article.

2. The process of claim 1 wherein the $\alpha,\beta$-ethylenically unsaturated aliphatic carboxylic acid is selected from the group consisting of acrylic acid, methacrylic acid, crotonic acid, isocrotonic acid, maleic acid, fumaric acid, citraconic acid, itaconic acid, and the alkyl monoesters of maleic acid, fumaric acid, citraconic acid and itaconic acid in which the alkyl group contains from 1 to 4 carbon atoms.

3. The process of claim 1 wherein the $\alpha,\beta$-ethylenically unsaturated aliphatic carboxylic acid is acrylic acid or methacrylic acid.

4. The process of claim 1 wherein the glycidyl monomer is glycidyl methacrylate.

5. The process of claim 1 wherein the article is silicone coated release paper.

* * * * *